Feb. 1, 1966     H. HORNSCHUCH     3,232,133
THRUST BEARING ARRANGEMENT
Filed Jan. 10, 1964     2 Sheets-Sheet 1

INVENTOR.
HANNS HORNSCHUCH
BY
David W. Tibbott
ATTORNEY

Feb. 1, 1966 H. HORNSCHUCH 3,232,133
THRUST BEARING ARRANGEMENT
Filed Jan. 10, 1964 2 Sheets-Sheet 2

INVENTOR
HANNS HORNSCHUCH
BY
David W. Tillott
ATTORNEY

3,232,133
THRUST BEARING ARRANGEMENT
Hanns Hornschuch, Easton, Pa., assignor to Ingersoll-Rand Company, New York, N.Y., a corporation of New Jersey
Filed Jan. 10, 1964, Ser. No. 336,919
2 Claims. (Cl. 74—421)

This invention relates to gearing and to bearings for speed changing units.

Conventional high speed gear boxes or units cannot carry and transmit large axial thrust loads. As a result, where large thrust loads are present, means must be provided outside of the gear box to carry such thrust loads and prevent them from reaching the gear box. In addition, if the large thrust loads are carried by shafts rotating at high speeds, say 10,000 r.p.m., the thrust bearings carrying the thrust loads are much more expensive than they would be if the shaft speeds are slower, say 3,600 r.p.m.

The principal objects of this invention are to eliminate the above problems by providing a high speed gear unit which can transfer high axial thrust loads and which can utilize low speed thrust bearings which are less expensive than high speed thrust bearings and have lower friction losses.

Other important objects include the following: to provide a high speed gear train which is able to transmit large thrust loads between its input and output shafts; to provide a more economical high speed gear unit for carrying high thrust loads; and to provide a high speed gear box which can safely and practically use commercial thrust bearings which are designed for use at lower speeds than the speeds carried by the gear box.

The objects of this invention generally are provided by arranging the input and output shafts of the gear train in axial alignment and connecting a thrust bearing between the shafts to transfer thrust loads between the shafts. If the two shafts rotate in the same direction, the thrust bearing operates at the relative speed between the shafts, regardless of the true speed of either shaft. Where this relative speed is lower than the speed of the shaft initially carrying the axial load, the bearing between the shafts can be one having a lower speed rating, corresponding with the relative speed between the shafts, which is less expensive than high speed thrust bearings.

The invention is described in connection with the accompanying drawings wherein.

Figure 4:
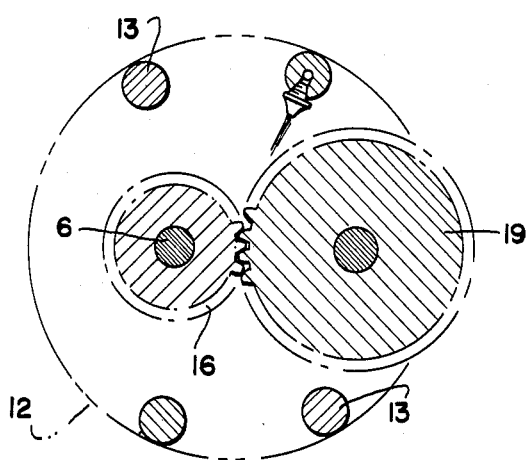
FIG. 4 is a section taken along the line 4—4 of FIG. 2 and also having a reduced scale.
Figure 1:
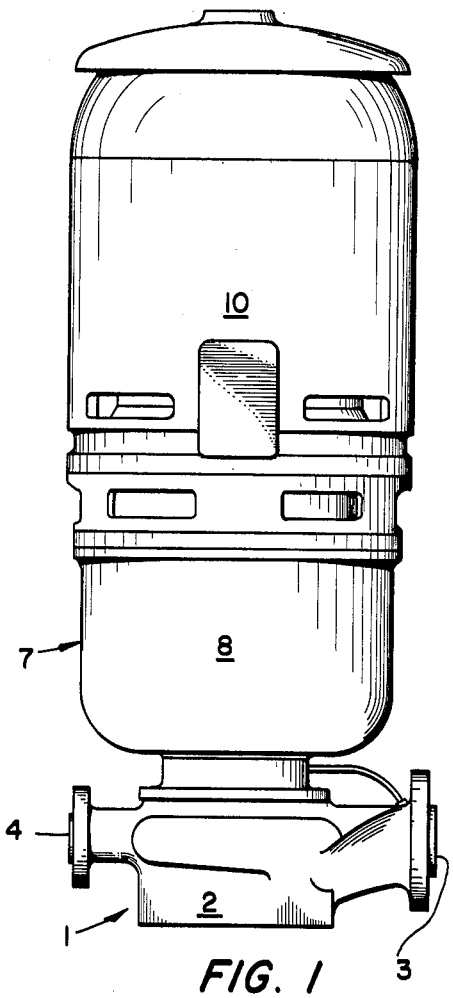
FIG. 1 is an elevational view of a vertically-mounted high speed motor pump using a speed-increasing gear box embodying the concepts of this invention.
Figure 3:
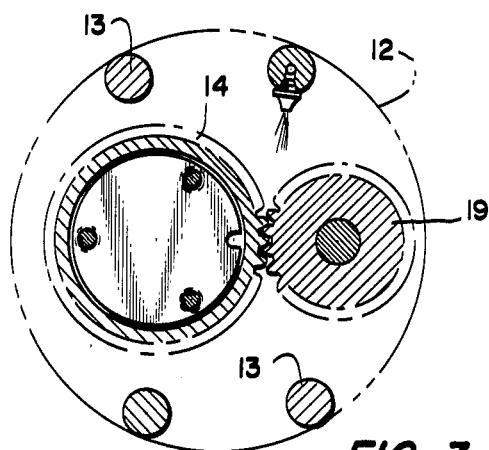
FIG. 3 is a section of FIG. 2 taken along the line 3—3 and having a reduced scale.
Figure 2:
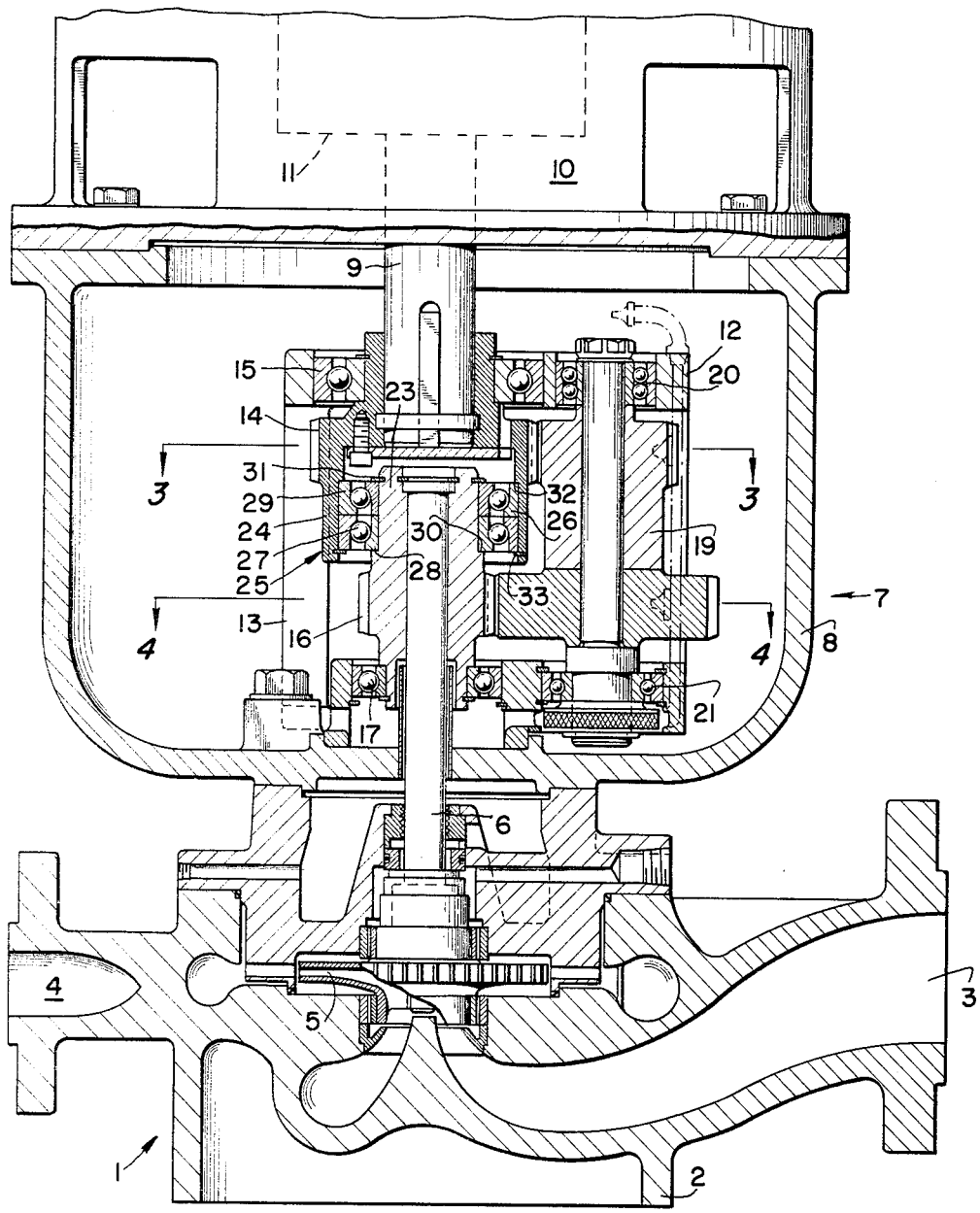
FIG. 2 is an enlarged and fragmentary axial section of FIG. 1.

The motor and pump combination illustrated in the drawings includes a centrifugal pump 1 having a casing 2 containing a fluid inlet 3, a fluid outlet 4 and a rotary impeller 5. The impeller 5 is mounted on the output shaft 6 of a speed-increasing gear box 7 mounted above the centrifugal pump 1 and mounted on the pump casing 2. The gear box 7 includes a housing 8 and an input shaft 9 projecting from the top of the gear box 7. An electric motor 10 is mounted on top of the gear box 7 with its rotor 11 drivingly connected to the input shaft 9.

In this embodiment, the motor 10 runs at a relatively low speed, say 3,600 r.p.m. and the pump 1 rotates at a much faster speed, say 10,000 r.p.m. In addition, a substantial pressure may exist in the inlet 3 of the pump 1 which urges or thrusts the impeller 5 upward. As a result, means must be provided for carrying and resisting the axial load on the output shaft 6, connected to the impeller 5.

The housing contains a gear-supporting frame 12 including an upper plate, also designated as 12, and a plurality of vertical legs 13 attached to the bottom of the housing 2 and supporting the plate 12. The input shaft 9 carries an input pinion 14 which is keyed to it. The input pinion 14 is rotatably mounted in the gear housing by a ball bearing 15 adapted to carry radial loads and supported in the frame plate 12. The output shaft 6 is keyed to an output pinion 16 which is rotatably mounted in the housing 8 by a ball bearing 17. The bearing 17 is designed to carry radial loads.

Also mounted in the gear housing 8 is a cluster gear 19 interconnecting the input and output pinions 14 and 16 and rotatably mounted in ball bearings 20 and 21 supported by the gear supporting frame 12. As can be seen from the drawing, this gear arrangement provides a substantial step-up in speed from the input shaft 9 to the output shaft 6. For example, if the input shaft 9 rotates at 3,600 r.p.m., the output shaft will rotate at about 10,000 r.p.m.

The input and output shafts 9 and 6 are mounted in axial alignment and the output pinion 16 includes a reduced diameter upper portion 23 which is surrounded by an open-ended sleeve or skirt 24 fixed on the input pinion 14. A thrust bearing 25 is mounted between the upper portion 23 of the output pinion 16 and the sleeve 24 of the input pinion 14. The bearing 25 includes two groups of balls 26 and 27 rolling between an inner race 28 and an outer race 29 and is intended to withstand both compressive and tensional axial loads.

The inner race 28 is fixed on the upper portion 23 of the output pinion 16 by a press fit. It seats against a shoulder 30 at the bottom of the reduced diameter portion 23 and is held in place by a lock ring 31.

The outer race 29 is press-fitted in the sleeve 24 on the input pinion 14 and seats against a shoulder 32. It is locked in place by a lock ring 33.

As a result of the coaxially aligned input and output shafts 9 and 6 being connected together by the thrust bearing 25, axial loads acting in either direction can be transferred from the output shaft 6 to the input shaft 9.

Both the input and output shafts 9 and 6 rotate in the same direction at different speeds. The thrust bearing 25 is subjected to the relative or differential speed between the two shafts 6 and 9. For example, if the input shaft 9 rotates at 3,600 r.p.m. and the output shaft 6 rotates at 10,000 r.p.m., the thrust bearing 25 operates at 6,400 r.p.m., the difference between the input and output shaft speeds.

It is known that anti-friction bearings, such as the thrust bearing 25, can withstand larger thrust loads at lower speeds than they can at high speeds. Hence, the thrust bearing 25 can withstand larger thrust loads at the differential speed, say 6,400 r.p.m., between the shafts 6 and 9 than it could if it supported the high speed output shaft 6 on a stationary surface such as the gear box housing 8. As a result, the thrust bearing 25 can be of a less expensive type which is used normally with low speed shafts.

Since the thrust in the output shaft 6 is transferred to the input shaft 9, means must be provided to counterbalance the thrust on the input shaft 9. This can be provided by the use of a relatively inexpensive low speed thrust bearing, since the input shaft 9 rotates at a low speed. In the arrangement shown in the drawing, a counter-balancing thrust is provided by mounting the motor 10 above the thrust generating pump 1 so that the weight of the motor rotor 11 rests on the input shaft 9 and counteracts the upward thrust of the output shaft 6.

Although a preferred embodiment of the invention is illustrated and described in detail, it will be understood that the invention is not limited simply to this embodiment, but contemplates other embodiments and variations which utilize the concepts and teachings of this invention.

Having described my invention, I claim:

1. A speed changing gear unit including:
   (a) a frame;
   (b) an input shaft and an output shaft rotatably mounted on said frame in axial alignment;
   (c) a set of gears interconnecting said shafts for transmitting torque loads between said shafts and causing them to rotate at different speeds relative to each other;
   (d) a thrust bearing interconnecting said shafts for transmitting axial thrust loads between said shafts acting in either direction;
   (e) said thrust bearing being of the rolling anti-friction type and including two axially spaced groups of rolling elements located between inner and outer races;
   (f) each group of rolling elements being adapted to carry a thrust load acting in a single axial direction which is opposite to the thrust load adapted to be carried by the other group of rolling elements; and
   (g) each of said races being mounted on one of said input and output shafts.

2. The gear unit of claim 1 wherein:
   (a) one of said shafts carries an open ended sleeve coaxially surrounding the other shaft;
   (b) said outer race of said thrust bearing is mounted on the interior of said sleeve; and
   (c) said inner race is mounted on the shaft surrounded by the sleeve.

References Cited by the Examiner

UNITED STATES PATENTS

| | | | |
|---|---|---|---|
| 933,144 | 9/1909 | Watson | 74—421.5 |
| 1,412,430 | 4/1922 | Verneuil | 74—421.5 |
| 2,578,446 | 12/1951 | O'Daniel | 74—421.5 |
| 3,074,089 | 1/1963 | Brown | 74—421.5 |

FOREIGN PATENTS

| | | |
|---|---|---|
| 974,803 | 5/1961 | Germany. |
| 902,496 | 8/1962 | Great Britain. |

DON A. WAITE, *Primary Examiner.*

ROBERT M. WALKER, *Examiner.*